US007006161B2

(12) United States Patent
Testin

(10) Patent No.: US 7,006,161 B2
(45) Date of Patent: Feb. 28, 2006

(54) BUS OPERATION WITH INTEGRATED CIRCUITS IN AN UNPOWERED STATE

(75) Inventor: William John Testin, Indianapolis, IN (US)

(73) Assignee: Thomson Licensing, Boulogne-Billancourt (FR)

(*) Notice: Subject to any disclaimer, the term of this patent is extended or adjusted under 35 U.S.C. 154(b) by 591 days.

(21) Appl. No.: 10/296,789

(22) PCT Filed: May 31, 2001

(86) PCT No.: PCT/US01/17472

§ 371 (c)(1),
(2), (4) Date: Nov. 26, 2002

(87) PCT Pub. No.: WO01/95121

PCT Pub. Date: Dec. 13, 2001

(65) Prior Publication Data

US 2003/0227573 A1    Dec. 11, 2003

Related U.S. Application Data

(60) Provisional application No. 60/209,085, filed on Jun. 2, 2000.

(51) Int. Cl.
*H04N 5/63* (2006.01)
(52) U.S. Cl. ............... 348/730; 348/721; 348/719; 714/25; 714/22; 710/100
(58) Field of Classification Search ............... 348/730, 348/733, 719, 721, 725, 552, 378, 180; 714/2, 714/14, 25, 22, 47; 710/100, 104, 113, 107; 307/126, 130, 43; 314/3.44, 3.43, 3.42; 713/300; 323/313, 332
See application file for complete search history.

(56) References Cited

U.S. PATENT DOCUMENTS

| 4,641,064 A | * | 2/1987 | Testin et al. ................. 315/411 |
| 4,656,399 A | * | 4/1987 | Testin et al. ................. 315/411 |
| 5,036,261 A | * | 7/1991 | Testin ......................... 315/411 |

(Continued)

FOREIGN PATENT DOCUMENTS

EP            671693            9/1995

(Continued)

OTHER PUBLICATIONS

The I2C Bus Specification, Version 2.1, Jan. 2000, Philips Semiconductors, pp. 1-46.

(Continued)

*Primary Examiner*—John Miller
*Assistant Examiner*—Jean Wicel Désir
(74) *Attorney, Agent, or Firm*—Joseph S. Tripoli; Joseph J. Laks; Reitseng Lin

(57) ABSTRACT

A circuit configuration applicable to systems such as consumer electronics devices enables communication between components such as integrated circuits connected to the bus. According to an embodiment, the RUN power supplies are turned to an OFF state in response to a fault condition. An interface circuit associated with an integrated circuit coupled to the bus controls the loading on the bus caused by the interface circuit and the integrated circuit such that communication between devices on the bus can continue. Therefore, even when a fault condition results in the loss of the RUN power supplies, a command can be transmitted over the bus from a first integrated circuit in a powered state to a second integrated circuit in the powered state while a third integrated circuit connected to the bus is in an unpowered state.

15 Claims, 5 Drawing Sheets

U.S. PATENT DOCUMENTS

| | | | | |
|---|---|---|---|---|
| 5,327,172 | A | 7/1994 | Tan et al. | 348/378 |
| 5,689,196 | A | 11/1997 | Schutte | 326/86 |
| 5,821,796 | A | 10/1998 | Yaklin et al. | 327/313 |
| 5,946,495 | A | 8/1999 | Scholhamer et al. | 375/750.01 |
| 6,000,042 | A | 12/1999 | Henrie | 714/40 |
| 6,092,138 | A | 7/2000 | Schutte | 710/113 |
| 6,145,036 | A | 11/2000 | Barenys et al. | 710/101 |
| 6,363,493 | B1 * | 3/2002 | Williams | 714/1 |
| 6,470,289 | B1 * | 10/2002 | Peters et al. | 702/132 |
| 6,678,268 | B1 * | 1/2004 | Francis et al. | 370/380 |
| 6,693,678 | B1 * | 2/2004 | Tults et al. | 348/571 |
| 6,785,835 | B1 * | 8/2004 | MacLaren et al. | 714/6 |
| 6,854,070 | B1 * | 2/2005 | Johnson et al. | 714/5 |
| 6,900,849 | B1 * | 5/2005 | Friedreich | 348/730 |

FOREIGN PATENT DOCUMENTS

EP  798922  10/1997

OTHER PUBLICATIONS

T4-Chip One Chip Color TV IC, Revision 8, May 15, 2001, TCE Part No. 15296960 (ES3E), pp. 1-114.

* cited by examiner

* NOTE: THE 16VSTBY LEVEL DROPS BY 4V WHEN THE FLYBACK IS OFF OR RIGHT AS IT IS TURNED ON

BUS OPERATION WITH INTEGRATED CIRCUITS IN AN UNPOWERED STATE

This application claims the benefit under 35 U.S.C. § 365 of International Application PCT/US01/17472, filed May 31, 2001, which was published in accordance with PCT Article 21(2) on Dec. 13, 2001 in English; and which claims benefit of U.S. provisional application Ser. No. 60/209,085 filed Jun. 2, 2000.

The present invention relates to an apparatus and method for communicating over a bus, and more particularly, to an apparatus and method for communicating over a bus connected to a plurality of integrated circuits when one or more of the integrated circuits are in an unpowered state.

Electronic systems, such as a television receiver, often include one or more busses for connecting a plurality of integrated circuits and allowing them to send and receive data between each other. A well known bus often used in consumer electronic applications is the inter integrated circuit bus ("IIC bus" or "I2C bus"). The IIC bus is a two transmission medium, bi-directional digital bus that permits two ICs to communicate on a bus path at a time. An IC serving in a "master" mode of operation, initiates a data transfer operation on the bus and generates clock signals that permit the data transfer. An IC serving in a "slave" mode of operation is the IC being operated on, or communicated to, by the master IC, whereby the slave IC is instructed to either send or receive data. Each IC is assigned a unique address on the bus.

Some systems include a plurality of IIC busses. In such systems, one IIC bus generally referred to as a standby ("STBY") bus is used to transmit signals when the system is turned OFF. For example, the STBY bus may be used to transmit signals for turning the system ON, such as signals between a microprocessor and an IC which controls various power supplies within the system. Another use for the STBY bus may be to provide communication between a microprocessor and an electrically-erasable programmable read-only memory (EEPROM). Systems may also include another IIC bus generally referred to as a run ("RUN") bus, which is used to transmit signals when the system is turned ON. The terms "RUN" and "STBY" may also be used to refer to different system power supplies. In particular, a RUN supply refers to a power supply used when the system is turned ON, while a STBY supply refers to a power supply used when the system is turned OFF. STBY supplies, however, may also provide power when the system is turned ON.

Some systems do not provide electrical power to any system ICs, except a micro-controller and some select ICs, when the system is turned OFF. When such systems are turned ON, the micro-controller typically must first turn ON the RUN supplies before attending to other system functions. Once all, system power supplies are operating, the micro-controller can then communicate with ICs on the RUN bus. There are instances, however, where it is necessary to communicate over a RUN bus before the system power supplies are operating.

For example, one such instance relates to an arrangement wherein an IC on the RUN bus receives power from both a STBY power supply and a RUN power supply. If a fault condition occurs in the system whereby the RUN power supplies are lost, the IC may continue to receive power from the STBY supply and not be aware of the fault condition. When the fault condition is corrected and the RUN power supplies are restored, the IC is unaware of the changing condition and immediately reverts to the previous operating condition. This may create undesirable loading conditions that may cause dips in the power supply if the IC causes excessive loading immediately after the power is restored. Under normal conditions, methods such as using boost circuitry or orderly power up procedure may be utilized upon start up to prevent such voltage dips and ensure orderly resumption to the operating condition. However, this may not be possible if one or more ICs on the bus are unaware of the fault condition and the micro-controller is unable to communicate with the ICs over the RUN bus.

In view of the above, it is desirable for the micro-controller to communicate with the various ICs coupled to the RUN bus when the RUN power supplies are inactivated. However, various conditions may hinder communication over the RUN bus before the RUN supplies are restored. First, due to the intrinsic substrate diode used for electro-static discharge (ESD) protection on input pins of ICs, it is often impossible to communicate with one IC on the RUN bus while the other ICs are not powered. Moreover, there are bus interface circuits to translate a 3.3 volt logic level to a 5 volt logic level bus that inhibit communication to a specific IC on the RUN bus with the RUN power supplies turned OFF. These conditions greatly hinder the ability to provide the necessary bus communication. Accordingly, there is a need to overcome the foregoing obstacles and enable communication over a bus while one or more ICs connected to the bus are in an unpowered state.

The present invention provides an apparatus and a method for overcoming the problems discussed above. In particular, the present invention provides an apparatus and method that ensures that an integrated circuit can communicate with other integrated circuits on a bus even when another integrated circuit on the bus is in an unpowered state.

In one aspect, the present invention is a circuit configuration, comprising: a bus coupled to a first power supply; a first integrated circuit coupled to the bus; a second integrated circuit coupled to the bus; and a third integrated circuit coupled to the bus via an interface circuit, the third integrated circuit and the interface circuit each being coupled to first and second RUN power supplies, respectively, wherein upon an occurrence of a fault condition that causes a loss of the RUN power supplies, the interface circuit controls the loading placed on the bus by the interface circuit and the third integrated circuit in a manner that enables the first integrated circuit and the second integrated circuit to continue to communicate with each other via the bus.

In another aspect, the present invention is a television apparatus, comprising: a bus coupled to a first power supply; an input for receiving television signals; a display including deflection circuitry; a micro-controller coupled to the bus; a first processing circuit coupled to the bus, the input and the display, the first processing circuit receiving the television signals and generating output signals to drive the display; a second processing circuit coupled to the bus via an interface circuit, the second processing circuit and the interface circuit each being coupled to first and second RUN power supplies, respectively, wherein upon an occurrence of a fault condition that causes a loss of the RUN power supplies, the interface circuit controls the loading placed on the bus by the interface circuit and the second processing circuit in a manner that enables the micro-controller and the first processing circuit to continue to communicate with each other via the bus, whereby the micro-controller is able to turn OFF the first processing circuit prior to reactivating the RUN power supplies.

The above-mentioned and other features and advantages of this invention, and the manner of attaining them, will become more apparent and the invention will be better understood by reference to the following description of embodiment of the invention taken in conjunction with the accompanying drawings, wherein.

The exemplifications set out herein illustrate preferred embodiments of the invention, and such exemplifications are not to be construed as limiting the scope of the invention in any manner.

Figure 1:
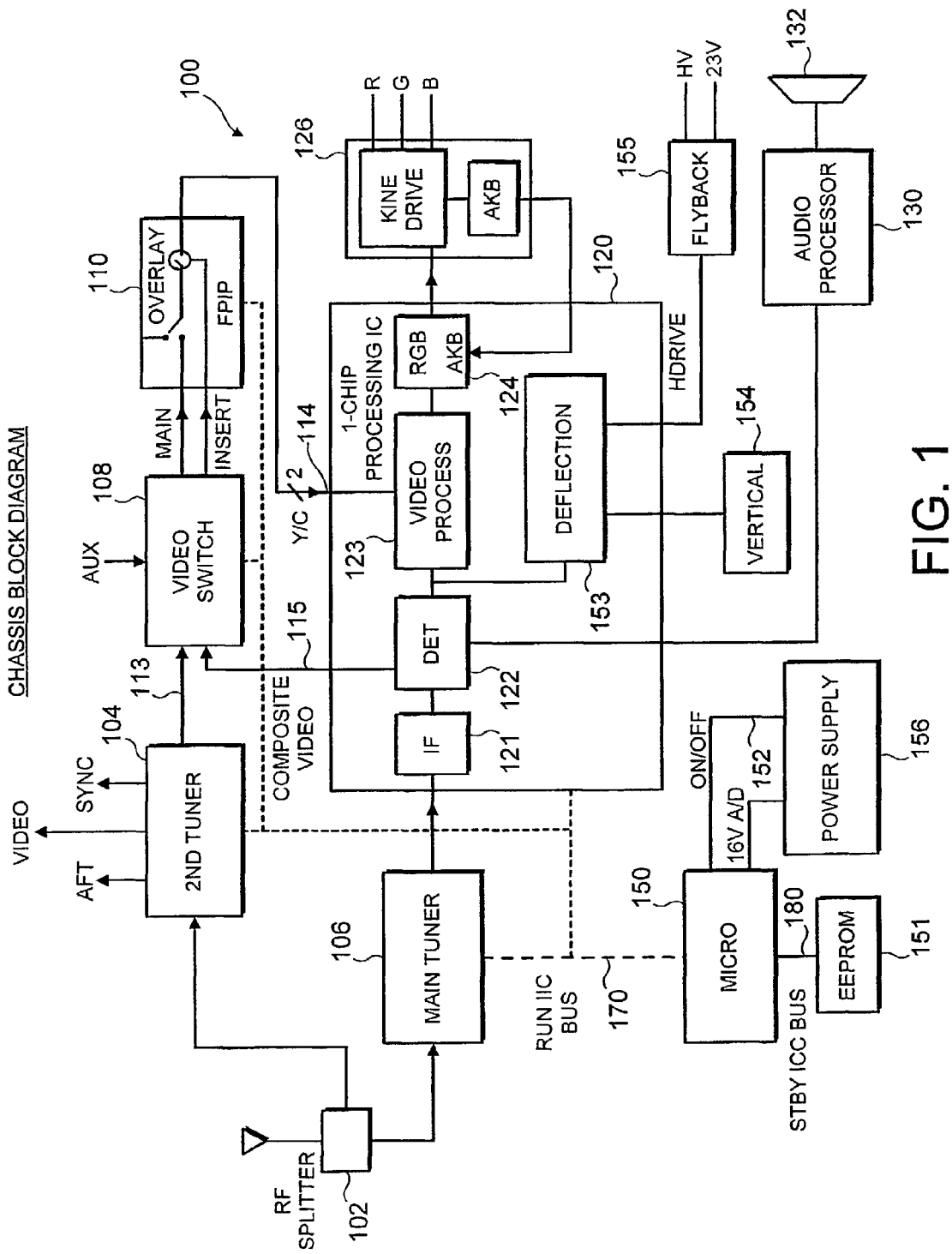
FIG. 1 is a block diagram of an exemplary television apparatus suitable for implementing the present invention.

Referring now to the drawings, FIG. 1 shows a block diagram of an exemplary television apparatus 100 for implementing the present invention. The structure and operation of the various elements of television apparatus 100 as they relate to the processing of the television signals are known to those skilled in the art and will not be described in detail herein. Television apparatus 100 includes input 102, which receives RF television signals, e.g., from an antenna or cable, and applies the signals to one of main tuner 106 and second tuner 104. The output of main tuner 106 is provided to one chip color TV IC 120, which performs a number of functions associated with processing the input video signal. One chip IC 120 is capable of performing the various functions associated with a color TV system including, but not limited to, sound IF and FM demodulation, audio volume control, video processing with selectable on-chip lowpass filters, video processing with selectable bandpass filters, horizontal and vertical deflection control, external RGB switching and AKB functionality. One chip ICs are known in the art and include, for example, LA7612N, manufactured by Sanyo Corporation.

The composite video output from one chip IC 120 is applied to an input of video switch 108. Video switch 108 also receives video inputs from second tuner 104 and the AUX input, and selects the desired video signal in response to user input. The video signals associated with the main and inset pictures are provided to FPIP IC 110, which combines the video signals to provide the desired video display. The combined video signal is provided to one chip IC 120, which provides the further processing to generate R, G, B, signals necessary to drive output circuit 126. One chip IC 120 also provides control for the deflection circuitry by controlling vertical drive circuitry 154 and flyback circuitry 155. One chip IC 120 also provides the separated audio signal to audio processor 130, which generates the signals to drive speaker 132. Television apparatuses that employ such a structure include, for example, CTC 195, manufactured by Thomson multimedia Inc. of Indianapolis Ind.

Micro-controller 150 controls the overall operation of television apparatus 100 and coordinates the operation of the various integrated circuits via the busses. Micro-controller also controls the overall ON/OFF state of television apparatus 100 via power supply control circuitry 156. Suitable micro-controllers included, but are not limited to, ST92196, manufactured by SGS Thomson.

The various integrated circuits associated with the television apparatus described above are interconnected by RUN IIC bus 170 and STBY IIC bus 180. As noted above, the IIC bus is a simple bi-directional 2 wire bus that provides for efficient inter IC control. The two wires, namely serial data (SDA) and serial clock (SCL) lines, carry information between the devices connected by the bus. Both SDA and SCL are normally connected to a positive supply voltage through a pull up resistor. When the bus is in the free condition, both SDA and SCL are in the HIGH condition. During data transfer, a designated master device generates clock signals on the SCL line, and addresses a designated slave device to initiate data transfer to or from the designated slave device. The data on the SDA line must be stable during the HIGH state of the clock, and the HIGH and LOW state of the data line can only change when the clock signal on the SCL line is LOW.

Figure 2:
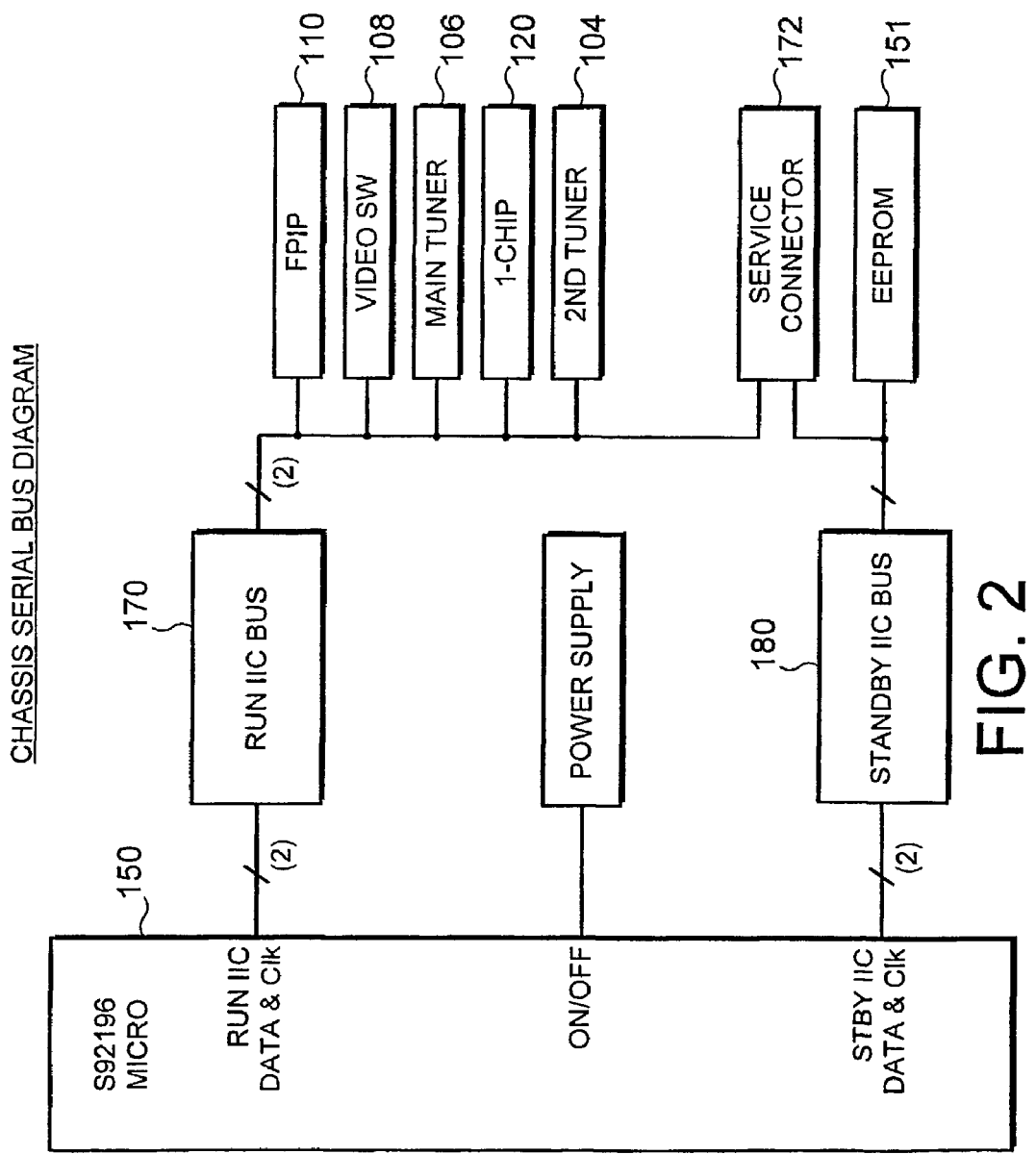
FIG. 2 is bus diagram illustrating the connection of the various integrated circuits to the microprocessor via the I2C busses.

As shown in FIG. 2, micro-controller 150 is coupled, via IIC RUN bus 170, to FPIP IC 110, video switch 108, main tuner 106, one chip IC 120, second tuner 104, and service connector 172. Micro-controller 150 is also coupled, via IIC STBY bus 180, to service connector 172 and EEPROM 174. In the present embodiment, micro-controller 150 turns ON television apparatus 100 via power supply control circuitry 156. During start up, micro-controller 150 first turns ON the RUN power supplies before it can turn ON the horizontal deflection and the various components of television apparatus 100. Once television apparatus 100 is turned ON and the various power supplies are operating, micro-controller 150 can communicate with the various components on IIC RUN bus 170. However, as discussed further below, it may be necessary for micro-controller 150 to communicate with various ICs when the RUN supplies are inactive. The present invention ensures that such communication is possible.

Figure 3:
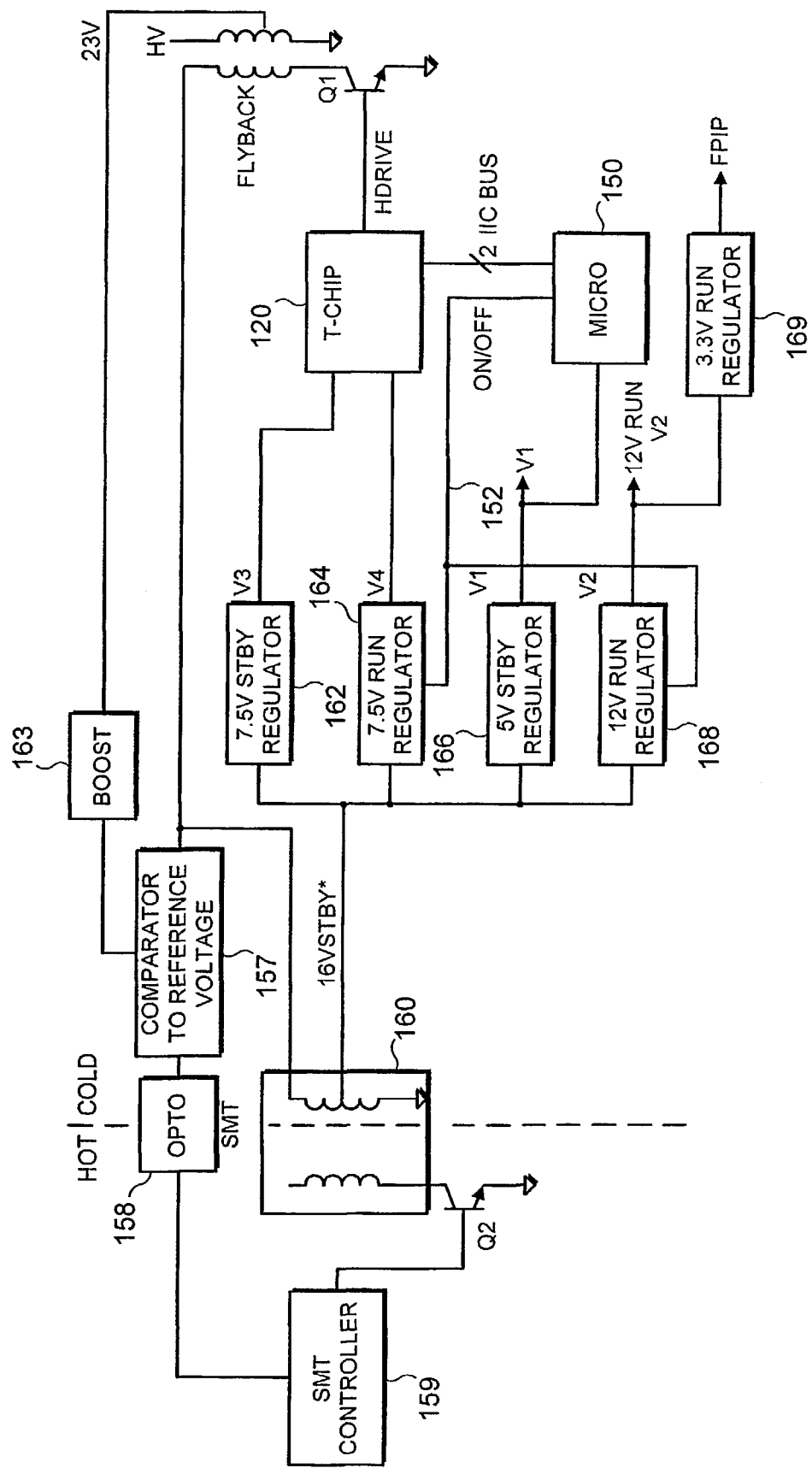
FIG. 3 is a block diagram illustrating the connection of the various power supplies to the integrated circuits of FIG. 2.
Figure 4:
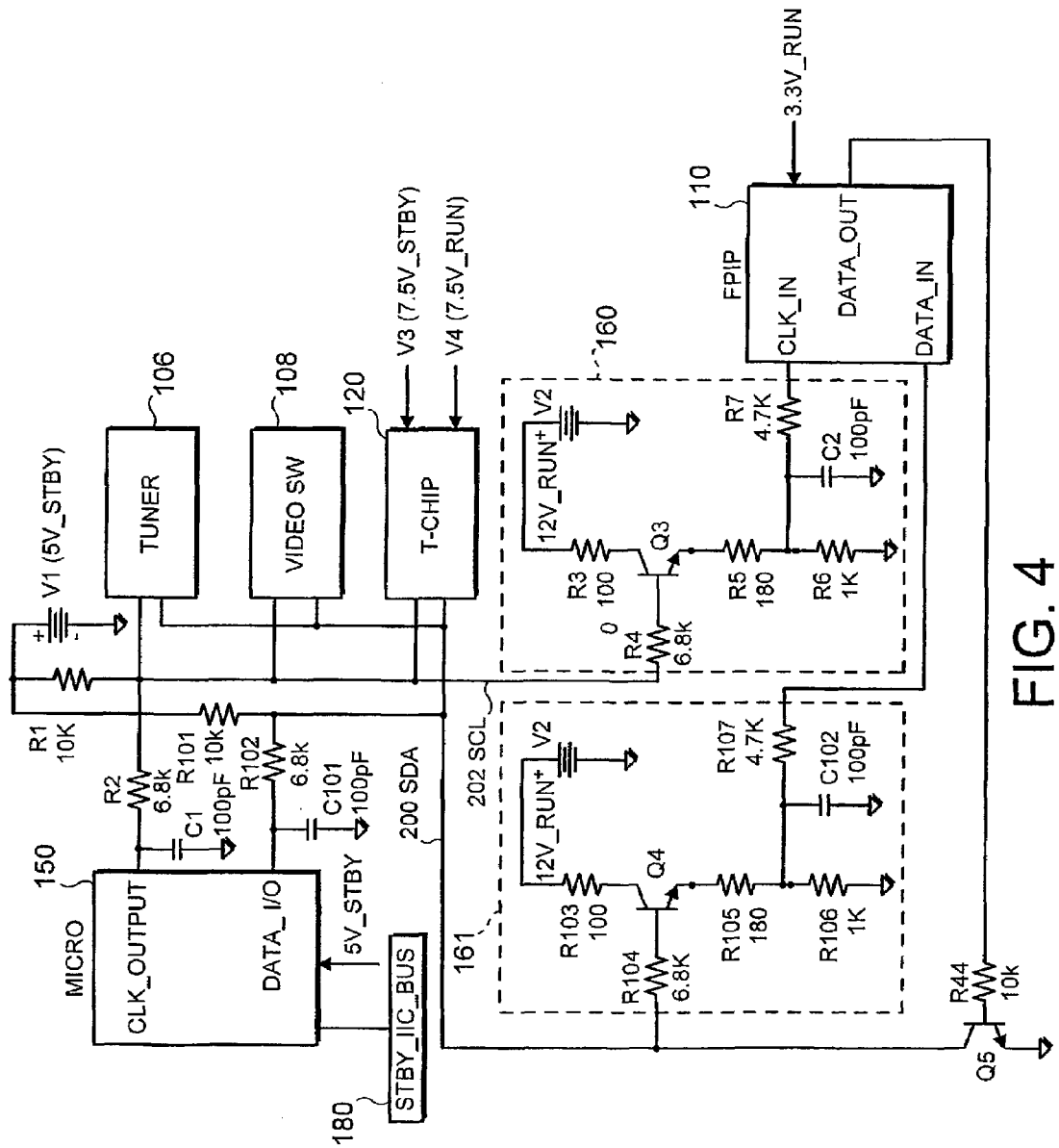
FIG. 4 is a schematic diagram illustrating the connection of the various integrated circuits to the I2C bus via a bus interface circuit.

The arrangement of micro-controller 150 with respect to the various power is supplies and to the various ICs according to the present invention is shown in FIGS. 3 and 4. As shown in FIG. 3, the main 16V supply for the various regulators is derived from a tap on the transformer that develops the 140V Reg B+. The primary side of SMT 160 is controlled by SMT controller 159 via switch Q2. The 16V supply is provided to the inputs of 7.5V STBY regulator 162, 7.5V RUN regulator 164, 5V STBY regulator 166, and 12V RUN regulator 168. The outputs of STBY regulator 162 and RUN regulator 164 are applied to one chip IC 120. The output of STBY regulator 166 is applied to RUN bus 170 ("V1") and to micro-controller 150. The output of RUN regulator 168 is applied to interface circuits 160 and 161 ("V2") and to RUN regulator 169, which in turn supplies the necessary operating voltage for the 3.3V devices in the apparatus, including FPIP IC 110. Micro-controller 150 controls the ON/OFF state of RUN regulators 164 and 168 via power supply control circuitry 156. Finally, one chip IC 120 controls the deflection circuitry in part via switch Q1.

As noted above, one chip IC 120 is powered from both STBY regulator 162 and RUN regulator 164. More specifically, the bus portions of one chip IC 120 is powered from STBY regulator 162 while the rest of the IC is powered from RUN regulator 164. The 5V standby voltage is applied to IIC RUN bus 170 through resistor R1.

FPIP IC 110 is coupled to RUN IIC bus 170, which comprises data line 200 and clock line 202, as shown in FIG. 4. FPIP IC 110 includes an input CLK_IN coupled to the clock line 202 via interface circuit 160 and input DATA_IN coupled to data line 200 via interface circuit 161. FPIP IC 110 also includes output DATA_OUT coupled to data line 200 via switch Q5. FPIP IC 110 receives the 3.3V operating supply from RUN regulator 169. An interface circuit is required to couple FPIP IC 110 to IIC RUN bus 170 to allow interoperability between the FPIP IC and the IIC RUN bus.

In particular, bus 170, micro-controller 150, tuner 106, video switch 108, and one chip IC 120 are 5V devices. That is, they each use 5 volts to represent a logic high state. By contrast, FPIP IC 110 is a 3.3V device. Therefore, interface circuitry is required to translate 5V logic to 3.3V logic. Although FIG. 4 only illustrates elements 150, 106, 108, 120 and 160 being coupled to IIC RUN bus 170, it is to be understood that additional ICs are coupled to IIC RUN bus 170 as well.

Interface circuitry 160 includes switch Q3, capacitor C2, and resistors R3–7. Preferred values for C2 and R3–7 are 100 pf, 100 ohms, 6.8K ohms, 180 ohms, 1 K ohms, and 4.7K ohms, respectively. The values of the elements of interface circuitry 160 are selected to ensure the desired loading on IIC RUN bus 170 in the event that the RUN power supplies are lost.

As noted, a problem arises in the arrangement described above with regard to the ability of micro-controller 150 to communicate with the various ICs on IIC RUN bus 170 in the event of a fault condition that causes the loss of the RUN power supplies. If a fault condition occurs, such as a "watchdog" event, the RUN power supplies are turned OFF, and as such, the RUN portions of one chip IC 120 are also turned OFF. However, since the bus portions of one chip IC 120 are powered through STBY regulator 162, one chip IC 120 continues to operate as if in the ON state. When the RUN power supplies are restored by micro-controller 150, one chip IC 120 immediately restores the drive for flyback in the deflection circuitry since IC 120 is unaware of the previous fault condition. As a result, the initial loading on the main switchmode supply is greater than expected and causes the output of the switchmode transformer SMT to dip, thereby causing a fault condition within television apparatus 100. The dip in the output of the transformer SMT may be prevented by the use of a boost circuitry as the flyback is activated. However, since one chip IC 120 is not aware that a fault condition has occurred and one chip IC 120 returns immediately to the previous operating condition, no provisions are made to compensate for this condition.

More specifically, power supply to regulators 162, 164, 166, and 168 are derived from an output of main switch mode transformer 160. The 16V standby supply is indirectly regulated by being on the same transformer as the 140V "regulated B+." The regulation is good as long as the 140 supply is loaded. When television apparatus 100 is turned OFF, the 140 V load is removed and the supply to the regulators drops to about 12V. Depending on tolerances, this level may or may not allow micro-controller 150 to start into the proper power down sequence. Boost circuitry 163 may be added to work around this problem. Boost circuitry 163 changes a resistor divider from the 140V supply into comparator 157 that drives opto-isolator 158 that controls the primary of SMT 160. When the 23V RUN supply off the flyback is active, boost circuitry 163 is inactive and the 140V supply is regulated at 140V. When television apparatus 100 is OFF, the 23V RUN supply is OFF and boost circuitry 163 boosts the 140V supply to about 160V. During normal turn ON, boost circuitry 163 remains active until the load of the 140V supply is present and stable. However, if the HDRIVE signal from one-chip IC 120 is not turned OFF due a "watchdog reset," kine-arc or ESD condition, boost circuitry 163 remains disabled. When micro-controller 150 comes out of the reset, and boost circuitry 163 is disabled, the 16V supply from SMT 160 will sag to about 12V. This prevents micro-controller from properly turning on television apparatus 100.

To prevent such an undesirable condition, all of the ICs coupled to IIC RUN bus 170 must be turned OFF prior to reactivation of the RUN power supplies. Therefore, micro-controller 150 must be able to turn OFF one chip IC 120 via RUN IIC bus 170 when the fault condition occurs. However, a problem occurs due to the fact that the supply for interface circuitry 160 and 161 are provided by RUN regulator 168. When the RUN power supplies are removed, the connection of RUN regulator 168 to the collectors of switches Q3 and Q4 tends to pull down the voltage on bus lines 200 and 202, respectively, thereby preventing communication via RUN IIC bus 170.

The present invention overcomes the above by providing an apparatus and method for ensuring that micro-controller 150 can continue to communicate with one chip IC 120, via IIC RUN bus 170 and interface circuitry 160 and 161, even when the RUN power supplies are removed. In particular, the exemplary interface circuit establishes and maintains a voltage on IIC RUN bus 170 that is sufficient to enable micro-controller 150 to communicate with one chip IC 120 when the RUN power supplies are removed. The exemplary interface circuitry includes a means for controlling the loading on IIC RUN bus 170 caused by the interface circuit and FPIP IC 110 to a predetermined level upon the loss of the RUN power supplies, which predetermined level is sufficient to ensure that micro-controller 150 can communicate with one chip IC 120. As such, micro-controller 150 is able to turn OFF one chip IC 120 even during a fault condition and prior to restoring the RUN power supplies.

The operation of the circuit of FIG. 4, including interface circuitry 160 and 161 is now described. Although the circuitry will be described with reference to interface circuitry 160, it is to be understood that a similar description is applicable to the operation of interface circuitry 161.

When a fault condition occurs, RUN power supplies 164 and 168 become inactivated. In particular, the 12V supply to interface circuit 160 ("V2"), the RUN supply to one chip IC 120 ("V4"), and the 3.3V RUN supply to FPIP IC 110 become inactivated. Micro-controller 150 and the bus portions of one chip IC 120 continued to receive power through STBY regulators 166 and 162, respectively.

With regard to IIC RUN bus 170, the loading of clock line 202 is established as follows. As previously indicated, the voltage on bus line 202 is approximately 5V when bus 170 is active, and the system uses 5V to represent a logic high state. Accordingly, in order for bus line 202 to mimic a state wherein television apparatus 100 is ON, the voltage on bus line 202 must represent a logic high state. In establishing the voltage on bus line 202, the intrinsic diode from the base to collector of transistor Q3 clamps the voltage on the base to 0.7 volts (assuming the current in the 100 ohm resistor R3 is low). The pull-up for the base of transistor Q3 is resistor R1, which is connected to the 5V STBY regulator 166. The voltage on bus line 202 is determined by resistor R1's 10K ohm pull-up to 5V, the drop across the 6.8K ohm resistor R4, and the base-collector voltage of transistor Q3 (which is approximately 0.7 volts). Therefore, when the RUN supplies are inactive, the voltage on clock line 202 is approximately 2.5 volts. Since one chip IC 120 has a voltage threshold of 2.4 volts for a logic high state, a bus line voltage of 2.5 volts is sufficient to ensure that one chip IC 120 can detect a logic high state on clock line 202. Although the value of resistor R4 is 6.8K ohms in the exemplary embodiment, the value of resistor R4 may be selected as necessary to ensure that the loading on RUN bus 170 remains above the threshold required for one chip IC 120 to recognize a logic HIGH level. It can be seen that the value of resistor R4 may be selected as desired to control the loading of interface circuitry 160 and FPIP IC 110 during a fault condition. The desired loading may be determined by the threshold voltage necessary for an IC on the bus to detect a high state.

To improve reliability, a "push-pull" mode of one chip IC 120 may be used. In this mode, the output voltage of micro-controller 150 is limited to 3.3V, but the drive impedence now becomes about 2K ohms, rather than 10 K ohms, working against R4+R3 plus the 0.7V from the base collector junction of Q3. Using the push pull mode provides additional drive capability. The push pull mode is described in further detail in U.S. patent application Ser. No. 09/581,780, filed Nov. 9, 2000, which is assigned to the assignee of the present invention and is incorporated herein. Once the voltage on clock line 202, as well as data line 200, is established in the aforementioned manner, micro-controller 150 can a command to one chip IC 120 over RUN bus 170 causing one chip IC 120 to turn OFF. By turning one chip IC 120 OFF before the RUN power supplies are turned back ON, a fault condition is avoided.

Figure 5:
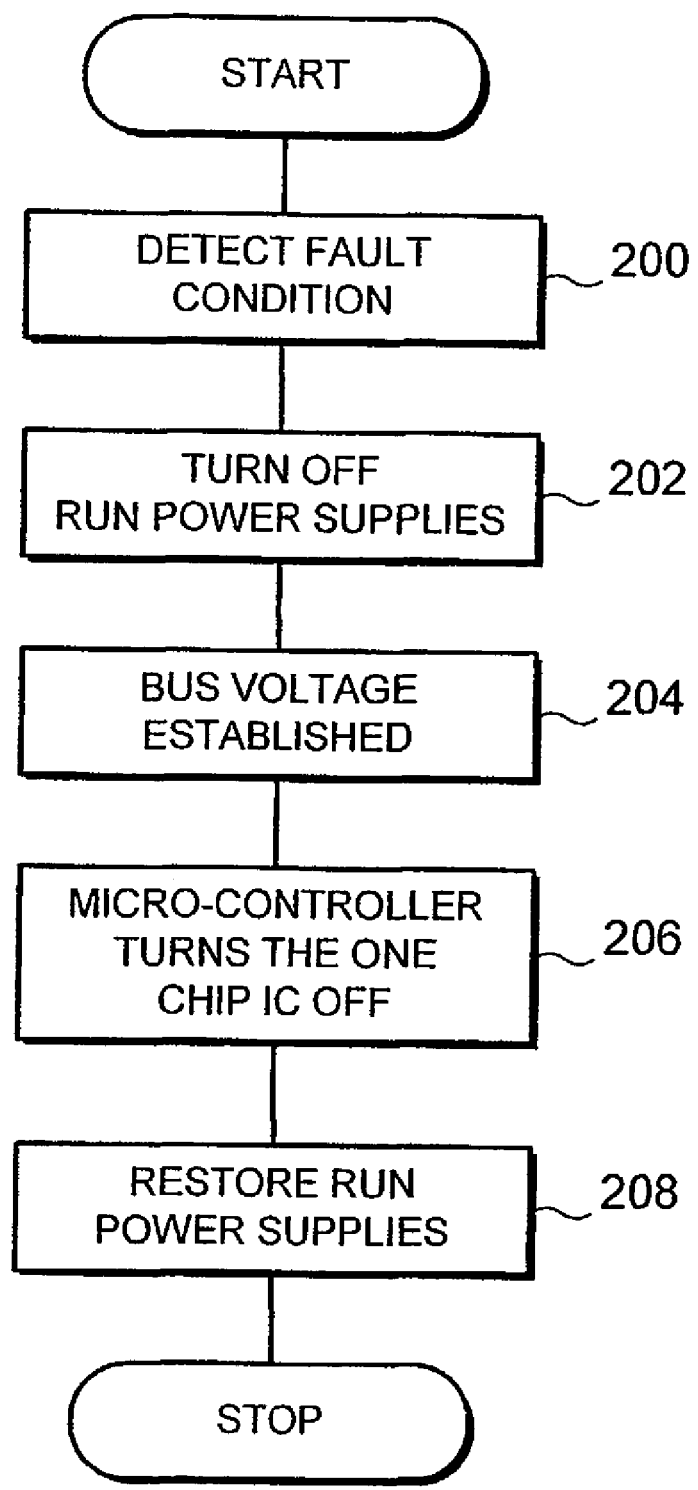
FIG. 5 is a flowchart illustrating the operation of the circuit configuration of FIG. 4.

FIG. 5 a flowchart illustrating the sequence during a fault and restart condition for television apparatus 100 wherein various ICs of television apparatus 100 are placed in the OFF condition to ensure that proper restart of television apparatus can be performed. In step 200, a fault condition is detected, and in response, the RUN power supplies are turned OFF in step 202. When the RUN power supplies are turned OFF, the interface circuitry establishes a new voltage on bus 170 in step 204. As described above, the new voltage is sufficient to ensure that micro-controller 150 can communicate with one chip IC 120 in step 206. Once the various ICs, including one chip IC 120, have been turned OFF, micro-controller restores the RUN power supplies in step 208 during the start up process.

Although the present exemplary embodiment describes the use of a one chip IC used in performing color TV functions, the present invention is applicable to any circuit arrangements wherein an IC is coupled to a bus via an interface circuit, and wherein a fault condition may result in loading of the bus in a manner that may prevent communications via the bus. Furthermore, although described in relation to an exemplary television apparatus, the present invention is applicable to any audio, video or other consumer electronics device, such as a video cassette recorder (VCR), digital satellite receiver, digital video disc (DVD) player, compact disc player, computer, or similar system, wherein it may be desirable to ensure communication over a bus as described. Furthermore, the present invention may be applied in the context of devices that are networked over a particular bus. In such a networked environment, the loss of power to one device may result in loss of the ability to communicate over the bus. Similar to the loading control provided by the interface circuitry of the present invention, the main interface circuitry of the devices may be designed to limit the loading to a predetermined level that permits the devices, or selected devices, on the bus to communicate with each other.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A circuit configuration, comprising:
a bus coupled to a first power supply;
a first integrated circuit coupled to the bus, the first integrated circuit recognizing a first predetermined voltage level as logic HIGH level;
a second integrated circuit coupled to the bus, the second integrated circuit recognizing the first predetermined voltage level as logic HIGH level; and
a third integrated circuit coupled to the bus, wherein the third integrated circuit recognizes a second predetermined voltage, which differs from the first predetermined voltage level, as logic HIGH level, the third integrated circuit being coupled to the bus via an interface circuit that performs bi-directional level shifting to allow interoperability of the third integrated circuit with the first and second integrated circuits, the third integrated circuit and the interface circuit each being coupled to first and second RUN power supplies, respectively, and wherein upon a fault condition that results in a loss of the RUN power supplies, the loading placed on the bus by the interface circuit and the third integrated circuit is controlled to a level that enables the first integrated circuit and the second integrated circuit to continue to communicate with each other via the bus.

2. The circuit configuration of claim 1, wherein the second integrated circuit is coupled to a second power supply and a third RUN power supply, and wherein during the fault condition the first, second and third RUN power supplies are lost.

3. The circuit configuration of claim 1, wherein the interface circuit comprises a bipolar transistor having a base coupled to the bus via a first resistor, a collector coupled to the second RUN power supply and an emitter coupled to an output of the third integrated circuit, and wherein the loading of the interface circuit and the third integrated circuit on the bus during a fault condition is determined in response to the value of the first resistor.

4. The circuit configuration of claim 1, wherein the bus is an IIC bus, the first integrated circuit is a 5V device and the third integrated circuit is a 3.3V device.

5. The circuit configuration of claim 4, wherein the loading on the bus is controlled to maintain at least 2.5V on the bus during a fault condition when the RUN power supplies are lost.

6. A television apparatus, comprising:
a bus coupled to a first power supply;
an input for receiving television signals;
a display including deflection circuitry;
a micro-controller coupled to the bus, the micro-controller recognizing a first predetermined voltage level as logic HIGH;
a first processing circuit coupled to the bus, the input and the display, the first processing circuit receiving the television signals and generating output signals to drive the display, the first processing circuit recognizing the first predetermined voltage level as logic HIGH;
a second processing circuit coupled to the bus; wherein the second processing circuit recognizes a second predetermined voltage level that differs from the first predetermined voltage level as logic HIGH, the second processing circuit is coupled to the bus via an interface circuit that translates voltage level to allow interoperability of the second processing circuit with the micro-controller and the first processing circuit, the second processing circuit and the interface circuit each being coupled to first and second RUN power supplies, respectively, and wherein upon a loss of the RUN power supplies, the loading placed on the bus by the interface circuit and the second processing circuit is controlled in a manner that enables the micro-controller and the first processing circuit to continue to communicate with each other via the bus, whereby the micro-controller is able to turn OFF the first processing circuit prior to reactivating the RUN power supplies.

7. The television apparatus of claim 6, wherein the interface circuit comprises a bipolar transistor having a base coupled to the bus via a first resistor, a collector coupled to the second RUN power supply and an emitter coupled to an output of the second processing circuit, and wherein the loading of the interface circuit and the second processing circuit on the bus during a fault condition is determined in response to the value of the first resistor.

8. The television apparatus of claim 7, wherein the first processing circuit is a one chip integrated circuit having a plurality of color TV functions incorporated therein, including deflection circuitry control.

9. The television apparatus of claim 8, wherein the first processing circuit includes a bus portion coupled to a second power supply and a control portion for controlling the deflection circuitry coupled to a third RUN power supply.

10. The television apparatus of claim 9, wherein the first processing circuit is turned OFF via the bus in response to a fault condition and prior to initiating a start up procedure, whereby an HDRTVE signal from the first processing circuit to the deflection circuitry is removed.

11. The television apparatus of claim 10, wherein the bus is an IIC bus, the micro-controller is a 5V device and the second processing circuit is a 3.3V device.

12. The television apparatus of claim 10, wherein the micro-controller is coupled to a power supply control circuitry that controls the ON/OFF state of the RUN power supplies.

13. The television apparatus of claim 10, wherein the first processing circuit is capable of operating in a push pull mode of operation to increase the voltage on the bus during a fault condition when the RUN supplies are lost.

14. The television apparatus of claim 10, further comprising a boost circuit operatively coupled to a source for the first and second power supplies, the boost circuit capable of being enabled when the IIDRIVE signal is absent.

15. A network, comprising:

a bus coupled to a first power supply;

a first electronic device coupled to the bus, the first electronic device recognizing a first predetermined voltage level as logic HIGH;

a second electronic device coupled to the bus, the second electronic device recognizing the first predetermined voltage level as logic HIGH; and a third electronic device coupled to the bus, wherein the third electronic device recognizes a second predetermined voltage level that differs from the first predetermined voltage level as logic HIGH, the third electronic device being coupled to the bus via an interface circuit that translates voltage levels to allow interoperability between of the third electronic device with the first and second electronic devices, the third electronic device and the interface circuit each being coupled to a RUN power supply, and wherein upon a loss of the RUN power supply, the loading placed on the bus by the interface circuit and the third electronic device is controlled in a manner that enables the first electronic device and the second electronic device to continue to communicate with each other.

\* \* \* \* \*